(12) United States Patent
Grente et al.

(10) Patent No.: US 9,759,837 B2
(45) Date of Patent: Sep. 12, 2017

(54) GROUND FAULT TOLERANT DATA COMMUNICATION SYSTEM FOR A DOWNHOLE INSTRUMENT

(71) Applicant: Sercel-GRC Corporation, Tulsa, OK (US)

(72) Inventors: Guillaume Grente, Tulsa, OK (US); Anthony Thornberry, Tulsa, OK (US); David Funkhouser, Austin, TX (US); Bryon Western, Tusla, OK (US)

(73) Assignee: SERCEL-GRC CORPORATION, Tulsa, OK (US)

( * ) Notice: Subject to any disclaimer, the term of this patent is extended or adjusted under 35 U.S.C. 154(b) by 0 days.

(21) Appl. No.: 15/028,821

(22) PCT Filed: Nov. 11, 2014

(86) PCT No.: PCT/US2014/064982
§ 371 (c)(1),
(2) Date: Apr. 12, 2016

(87) PCT Pub. No.: WO2015/073420
PCT Pub. Date: May 21, 2015

(65) Prior Publication Data
US 2016/0259086 A1    Sep. 8, 2016

Related U.S. Application Data

(60) Provisional application No. 61/903,266, filed on Nov. 12, 2013.

(51) Int. Cl.
*G01V 3/00* (2006.01)
*G01V 11/00* (2006.01)
(Continued)

(52) U.S. Cl.
CPC .......... *G01V 11/002* (2013.01); *E21B 43/128* (2013.01); *E21B 47/122* (2013.01); *H02H 7/08* (2013.01); *H02H 9/04* (2013.01)

(58) Field of Classification Search
CPC .................................................... G01V 11/002
(Continued)

(56) References Cited

U.S. PATENT DOCUMENTS

| 6,176,308 B1 | 1/2001 | Pearson |
| 6,283,227 B1 * | 9/2001 | Lerche .................... E21B 41/00 |
| | | 102/215 |

(Continued)

FOREIGN PATENT DOCUMENTS

GB    2491823    12/2012

*Primary Examiner* — Santiago Garcia
(74) *Attorney, Agent, or Firm* — Ipsilon USA, LLP

(57) ABSTRACT

This invention relates to a data communication system/method for use in a downhole application wherein electrical energy is supplied over a multiple-conductor power cable to a motor assembly of a downhole tool such as an electric submersible pump. A power leg coupling interfaces a surface controller of a downhole instrument to the conductors of the tool's power cable. Uplink communication of telemetry data occurs via current modulation generated by the downhole instrument and interpreted by a surface controller. Downlink communication of downhole instrument data occurs over a different communication scheme supported by the downhole and surface controllers. Downlink communication scheme provides a supply of power to the downhole instrument. Protection of downhole electronics and continuity of communication is ensured in the event of a ground fault on the power cable. Both downlink and uplink communication frequencies are adaptive based on frequencies and voltages present on the power cable.

20 Claims, 4 Drawing Sheets

(51) Int. Cl.
*E21B 47/12* (2012.01)
*E21B 43/12* (2006.01)
*H02H 7/08* (2006.01)
*H02H 9/04* (2006.01)

(58) Field of Classification Search
USPC .................................................... 340/853.2
See application file for complete search history.

(56) References Cited

U.S. PATENT DOCUMENTS

| | | | |
|---|---|---|---|
| 6,421,618 B1* | 7/2002 | Kliman | G01R 31/025 |
| | | | 324/500 |
| 6,995,683 B2* | 2/2006 | Smithson | E21B 47/122 |
| | | | 166/250.17 |
| 7,982,633 B2 | 7/2011 | Booker et al. | |
| 8,138,622 B2 | 3/2012 | Layton et al. | |
| 8,149,552 B1* | 4/2012 | Cordill | E21B 43/128 |
| | | | 361/42 |
| 2001/0040030 A1* | 11/2001 | Lerche | E21B 41/00 |
| | | | 166/63 |
| 2003/0058125 A1* | 3/2003 | Ciglenec | E21B 7/061 |
| | | | 340/853.1 |
| 2004/0201493 A1 | 10/2004 | Robertson | |
| 2008/0196887 A1 | 8/2008 | McCoy et al. | |
| 2008/0272932 A1 | 11/2008 | Booker et al. | |
| 2009/0140879 A1* | 6/2009 | Kamata | G01V 11/002 |
| | | | 340/853.2 |
| 2010/0085210 A1* | 4/2010 | Bonavides | E21B 47/12 |
| | | | 340/853.2 |
| 2011/0090091 A1* | 4/2011 | Lerche | E21B 41/0021 |
| | | | 340/853.2 |
| 2013/0057412 A1* | 3/2013 | Gard | G01V 11/002 |
| | | | 340/854.9 |

* cited by examiner

GROUND FAULT TOLERANT DATA COMMUNICATION SYSTEM FOR A DOWNHOLE INSTRUMENT

CROSS-REFERENCE TO RELATED APPLICATIONS

This United States application is the National Phase of PCT Application No. PCT/US2014/064982 filed Nov. 11, 2014, which claims priority to United States Provisional patent application Ser. No. 61/903,266 filed Nov. 12, 2013, each of which is incorporated herein by reference.

BACKGROUND OF THE INVENTION

This invention generally relates to power supply and data communication systems for downhole tools or instruments. More particularly, this invention relates to a data communication system for a downhole instrument over a power cable.

Various communication systems exist for downhole instruments such as, but not limited to, electric submersible pump ("ESP") gauges and surface controllers.

An ESP system includes a downhole motor and pump assembly, a surface- located control unit, and one or more downhole gauges or instruments. A three-phase AC power supply located at the surface provides an AC power signal over a three-conductor power cable to the downhole motor and pump assembly. Depending on the motor size and length of the power cable, the operating voltage of the motor can be very large. The three-phase AC power signal is coupled to the motor by a balanced inductor network having a neutral, ungrounded node. This node is referred to as the wye point of the motor or the downhole wye point.

The downhole instrument associated with the ESP measures physical parameters of the wellbore such as temperature and pressure. The telemetry data that represents those physical parameters must be communicated to the control unit and various schemes for doing so have been implemented. Because the instrument and its control circuitry include sensitive electronic components, they must be protected from high voltage events such as those that occur during a ground fault. Most of these ESP systems use large inductive isolation chokes—which have the disadvantage to limit the data transfer rate —but also make use of direct current power supplies, which can cause operations to stop in case of a ground fault on the power cable. For example, where DC power is tapped from the wye point of the motor, a ground fault can lead to higher than desired power levels at the wye point, thereby jeopardizing the instrument's sensitive electronic components.

Some systems couple the downhole instrument to the motor wye point and provide a surface-located AC power supply to generate power at a higher frequency than the motor power supply frequency. These systems require high voltage capacitors located between the downhole instrument and the motor wye point (see e.g. U.S. Pat. No. 7,982,633 B2 to Booker et al. and U.S. Pat. No. 8,138,622 B2 to Layton et al.). The capacitors are large in size, expensive, and have uncertain reliability.

Some systems protect the downhole electronics from high AC voltage using semiconductor devices by adding circuitry below the wye point which makes use of a diode (and associated voltage clamp) that conducts during positive polarity voltage and a silicon-controlled rectifier (and associated resistor) that conducts during application of a negative polarity voltage to the instrument (see e.g. U.S. Pat. No. 8,149,552 B1 to Cordill). However, those systems still require the use of a large inductive choke (e.g., in a range of about 80 H or greater), and the semiconductor devices only function to keep the choke current balanced during ground fault conditions (see also e.g. U.S. Pat. No. 6,176,308 B1 to Pearson).

A need exists for a system which eliminates the need for large inductive isolation chokes and high voltage capacitors while still protecting the downhole instrument and allowing the downhole instrument to operate and communicate during ground fault conditions.

SUMMARY OF THE INVENTION

A power and bi-directional data communication system for a downhole instrument made according to this invention makes use of a megger test diode located below the wye point of a downhole motor assembly and a high voltage protection circuit located after the megger diode. The megger diode blocks current in case a negative voltage is applied to it which happens during a megger test. A downhole wye point sensor analyzes the voltage and frequency seen after the diode and listens for downlink communication between the downhole instrument and its surface controller. The downhole instrument's electronics are protected against any high voltage event by the high voltage protection circuit. The circuit allows the use of low voltage components at the output of the circuit, thereby limiting reliability issues and component cost.

During a ground fault, the circuit limits the voltage at its output to a lower value (preferably no greater than 80 V) and, therefore, protects the downhole electronics while still allowing communication with the surface controller during all positive cycles of the current waveform.

In a preferred embodiment, the high voltage protection circuit is a circuit having means such as a Zener diode or its equivalent to set or limit the voltage. At least one power semiconductor or an arrangement of power semiconductors (which can be several SiC FETS) see the voltage drop and dissipate significant power. Two or more stages of the protection circuit can be connected in series to distribute the voltage drop and power dissipation over the two or more stages.

An alternate embodiment of the high voltage protection circuit eliminates use of the Zener diode and instead uses a detection circuit that opens the connection between the downhole wye point and the downhole instrument when the downhole wye point voltage exceeds a predetermined value.

Uplink communication of telemetry data is generated by the downhole instrument by means of current modulation and is supported by the surface controller. By sensing voltage at the downhole wye point, the downhole electronics can perform frequency and voltage assessment. The current modulation passes through the high voltage protection circuit allowing for communication even during ground fault conditions.

The surface controller is AC-coupled to the multiple conductor power cable of the motor assembly and provides power to the downhole instrument by generating an AC power signal. Alternatively, during ground fault conditions the downhole instrument may be powered directly from the voltage generated at the downhole wye point.

Downlink communication occurs over a different communication scheme by modulating the frequency, the amplitude (or both frequency and amplitude) of the power supply generated by the surface controller. The surface power system is capable of analyzing the voltage signal at a surface wye point and adjusting the frequency of power transmission in order to avoid downstream communication interference caused by sources such as the downhole tool's (e.g., electric submersible pump ("ESP")) variable speed drive ("VSD").

The power and bi-directional data communication system eliminates the need for large inductive isolation chokes (e.g. 80 H or greater) or high voltage capacitors (e.g., 200 V or greater).

The objectives of this invention include: (1) limiting the downhole instrument's internal electronics' input voltage by means of advanced semiconductor arrangements and without the use of expensive and large high voltage capacitors and (2) providing a communication system for use with a downhole instrument that (i) is reliable, cost competitive, and immune to ground faults; (ii) provides relatively high transfer rates (>200 bps) for uplink communication; (iii) adapts upstream carrier frequency based on noise conditions; (iv) provides a downlink communication signal; and (v) adapts power signal frequency based on VSD conditions.

Figure 1:
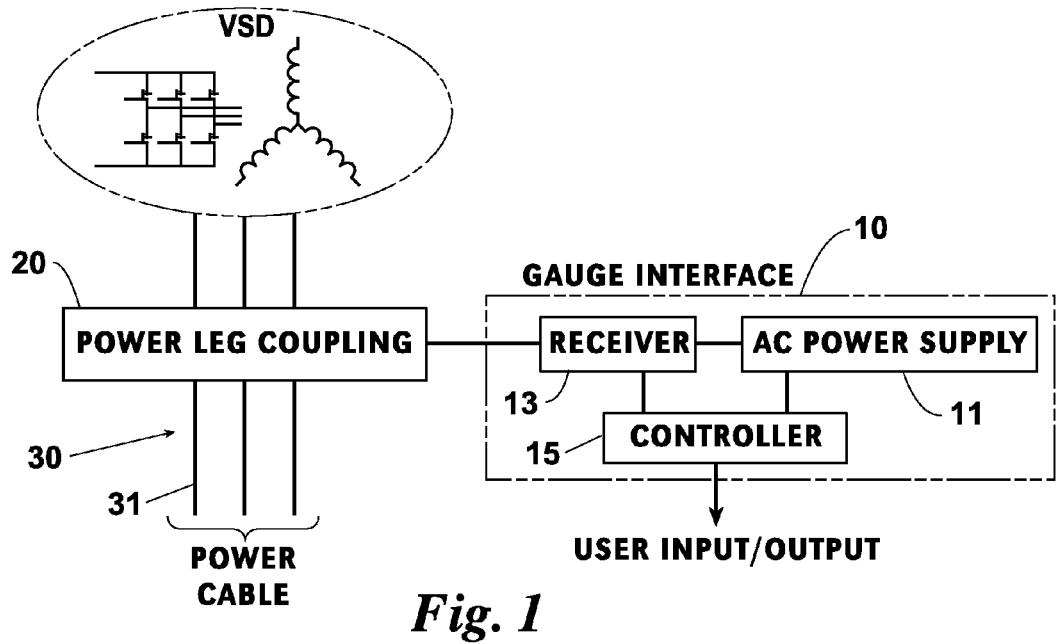
FIG. 1 is a block diagram of the surface equipment in a preferred embodiment of the system.

Elements and Element Numbering Used in the Drawings
10 Gauge interface
11 Surface AC power supply or source
13 Surface receiver
15 Surface controller
20 Power leg coupling
30 Power cable
31 Conductor
33 Filter
40 Wye point
50 Megger test diode
60 Downhole instrument
61 Wye point sensor
63 High Voltage protection circuit
65 Transmitter
67 Zener diode
69 Power semiconductor
71 High voltage detection circuit
73 Commutation semiconductor

DETAILED DESCRIPTION OF THE PREFERRED EMBODIMENTS

A bi-directional data communication system made according to this invention uses a high voltage protection circuit to pass a constant current to a downhole instrument during positive cycles of the power waveform even during a ground fault condition. The circuit lies between a megger test diode located below the downhole wye point of the motor and the downhole instrument. In one embodiment of the protection circuit, the voltage is limited by a Zener diode and a semiconductor arrangement dissipates power. In another embodiment of the protection circuit, the voltage is limited by a detection circuit which opens when a high voltage event occurs. The system limits voltage to the instrument but still allows current to pass to the instrument for communication during a ground fault.

Referring to FIGS. 1 to 8, a bi-directional data communication system for a downhole instrument 60 associated with a downhole tool such as an electric submersible pump ("ESP") modulates a current of the downhole instrument 60 through a high voltage protection circuit 63 for uplink communication and modulates a power waveform of the surface AC power source 11 for downlink communication to the instrument 60. Means such as a transmitter 65 generates a current modulated signal that encodes data collected by the sensors of the downhole instrument 60. The current modulation occurs on positive cycles of the power waveform. The output frequency of the surface AC power source 11 can be dependent on power cable spectrum components measured at a surface. Modulation carrier frequency of the downhole instrument 60 can be dependent on power cable spectrum components measured at the downhole three-phase wye point 40.

The instrument 60 is coupled to the surface AC power source 11 through a multi-conductor power cable 30 of a downhole tool. A megger test diode 50 is located below a wye point 40 of the downhole tool. At least one high voltage protection circuit 63 is connected to the megger test diode and includes means such as a Zener diode 67 or its equivalent for setting the limiting voltage seen by the electronics of the downhole instrument 60. The circuit 63 includes means such as one or more power semiconductors 69 for dissipating power. A wye point sensor 61 senses the voltage and frequency downstream of the megger test diode 50 and provides frequency assessment prior to uplink communication.

Figure 2:
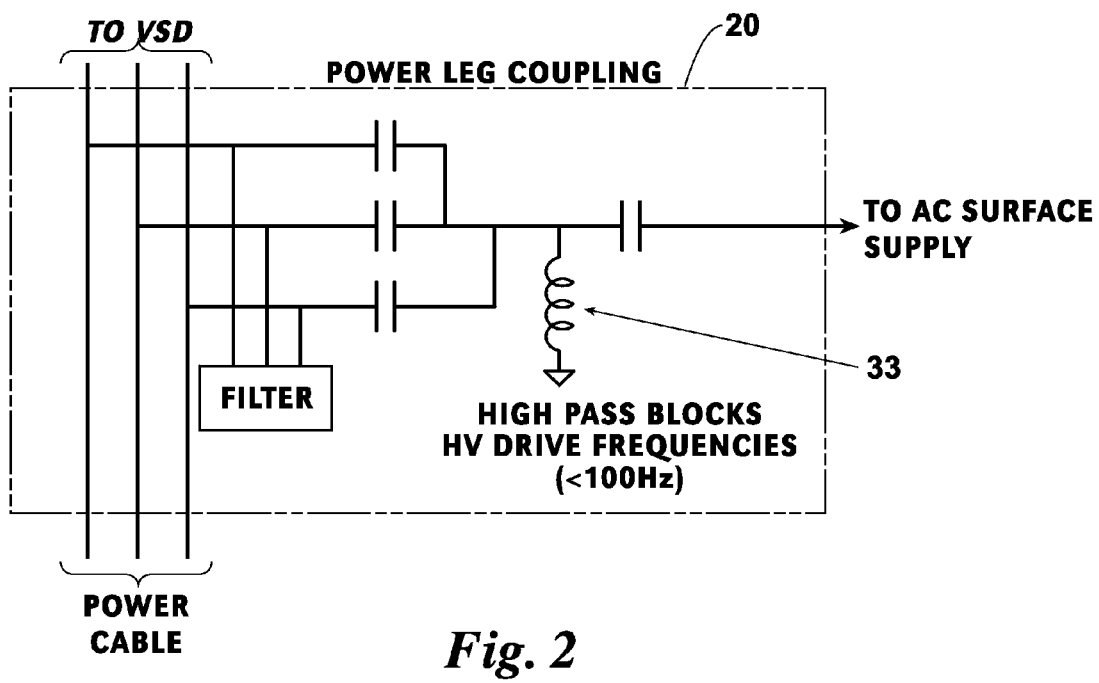
FIG. 2 is a schematic of the power leg coupling between the surface controller and the power cable of a downhole tool motor assembly.

Preferably, the inductive isolation choke used in connection with this invention is in a range of 2.5 to 3 H to filter high frequency spikes. The system does not require the use of large inductive isolation chokes (e.g., 80 H or above) or high voltage capacitors (e.g. 200 V or above). Referring first to FIGS. 1 & 2, a gauge interface 10 includes a surface AC power supply 11, receiver 13, and controller 15 in communication with the receiver 13. The surface controller 15 powers the downhole instrument (e.g., an electric submersible pump ("ESP") gauge) and provides an interface for communication with the downhole instrument.

A power leg coupling 20 interfaces the surface controller 15 to the conductors 31 of the power cable 30 connected to a motor assembly of a downhole tool. The power leg coupling 20 makes use of capacitors and inductors to create a high pass filter 33 that attenuates high voltage drive frequencies (<100 Hz).

Figure 3:
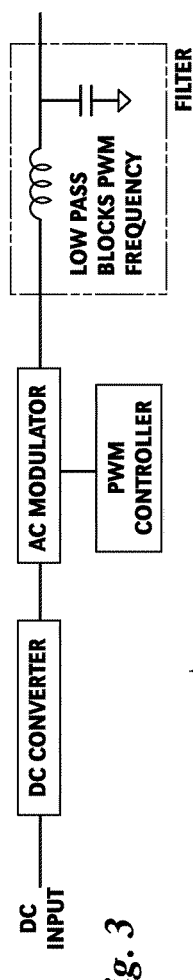
FIG. 3 is a block diagram and schematic of the AC power supply of the surface controller.
Figure 4:
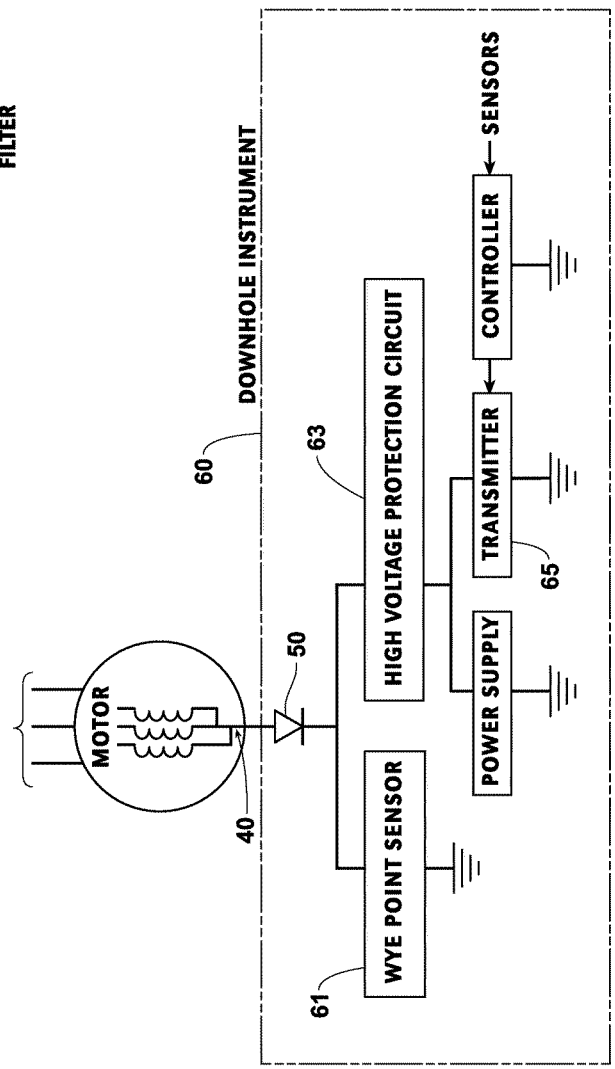
FIG. 4 is a block diagram of the downhole instrument located below the motor.
Figure 5:
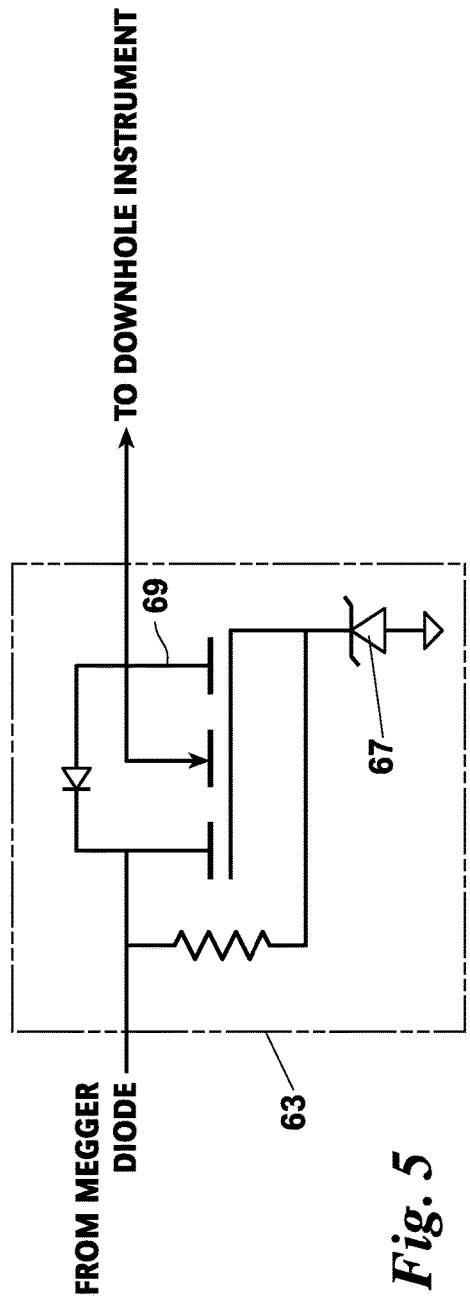
FIG. 5 is a schematic of an embodiment of a single stage high voltage protection circuit.
Figure 6:
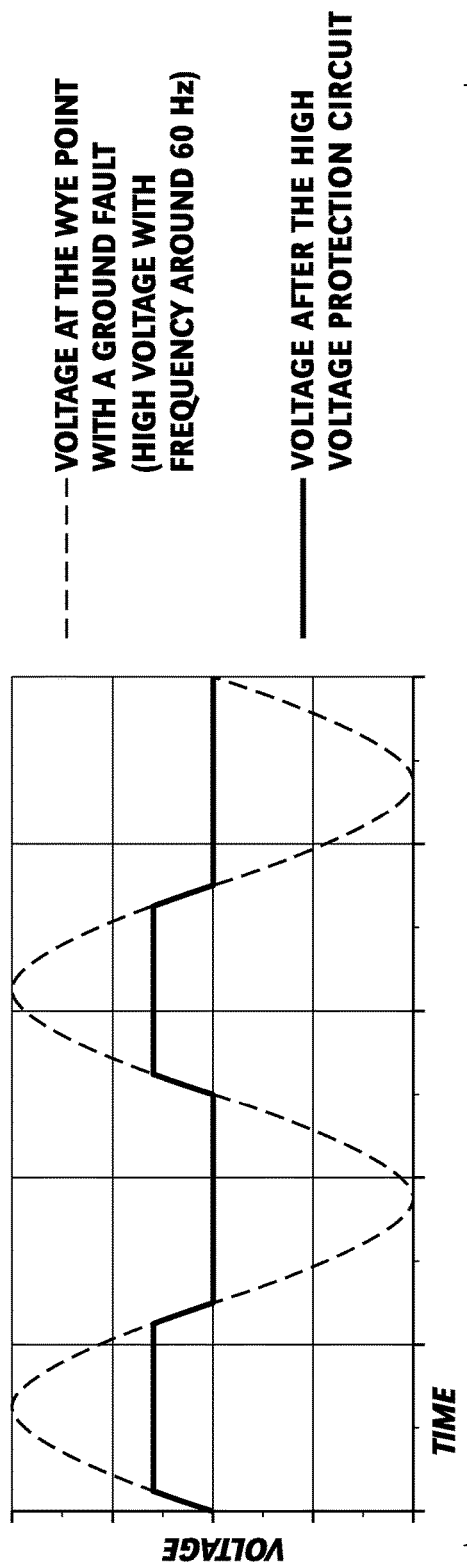
FIG. 6 is an example of the voltage seen at the output of the high voltage protection circuit.

The surface power supply 11 provides power to the downhole instrument and an AC-DC converter/regulation stage (see FIG. 3). Power cable impedance (which rises with frequency) attenuates leakage on the power supply 11 in case of a ground fault, thereby allowing some current to flow to the downhole instrument for its proper operation.

The surface receiver 13 analyzes the current drawn by the downhole instrument and looks for specific current patterns or frequencies to discriminate uplink communication signals from noise. Downlink communication is done by modulating the frequency, amplitude, or both frequency and amplitude of the power supply 11.

The surface controller 15 manages the power supply 11 and controls the frequency and amplitude of the voltage being generated. The surface controller 15 also analyzes uplink telemetry data and provides data to a user through means well known in the art. Both power supply and uplink telemetry frequencies can be changed based on noise and operating conditions on the power cable 30. The noise spectrum on the power cable 30 can be analyzed by embedded systems using well known methods (such as Fourier transform or digital filtering).

The downhole instrument 60 is coupled to the motor assembly's wye point 40 through a megger test diode 50. This diode 50 blocks current when negative voltage is applied, which happens during a megger test (see FIG. 4). Preferably, the diode 50 is a 10 kV diode (thereby accommodating a 5 kV megger test). A downhole wye point sensor 61 analyzes the voltage and frequency seen after the diode 50 and listens for downlink communication between the downhole instrument 60 and the surface controller 15. The downhole instrument's electronics are protected against any high voltage event by a high voltage protection circuit 63. The circuit 63 allows the use of low voltage components at the output of the circuit 63, thereby limiting reliability issues.

Figure 7:
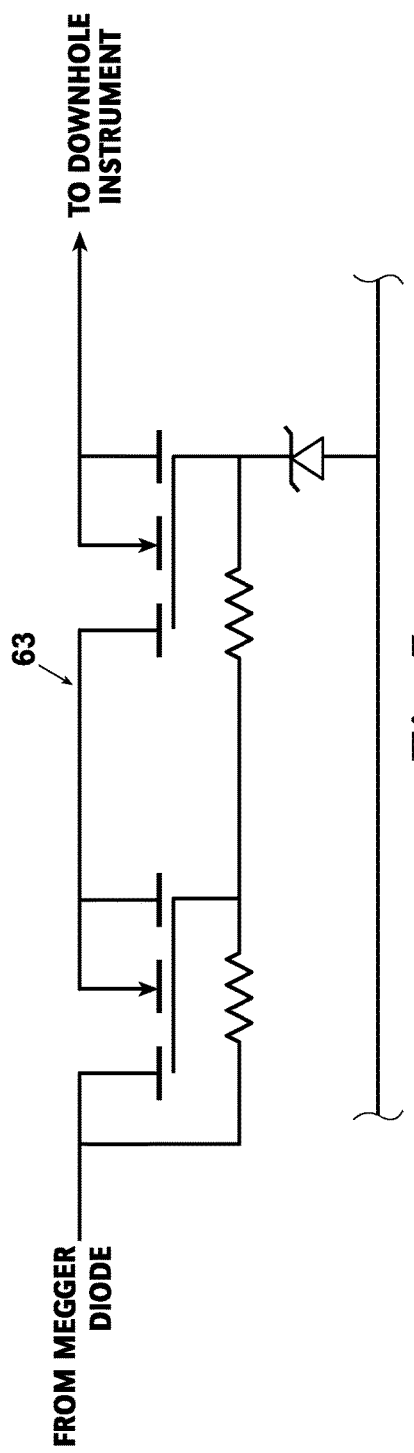
FIG. 7 is a schematic of an embodiment in which two or more stages of high voltage protection circuits are used.
Figure 8:
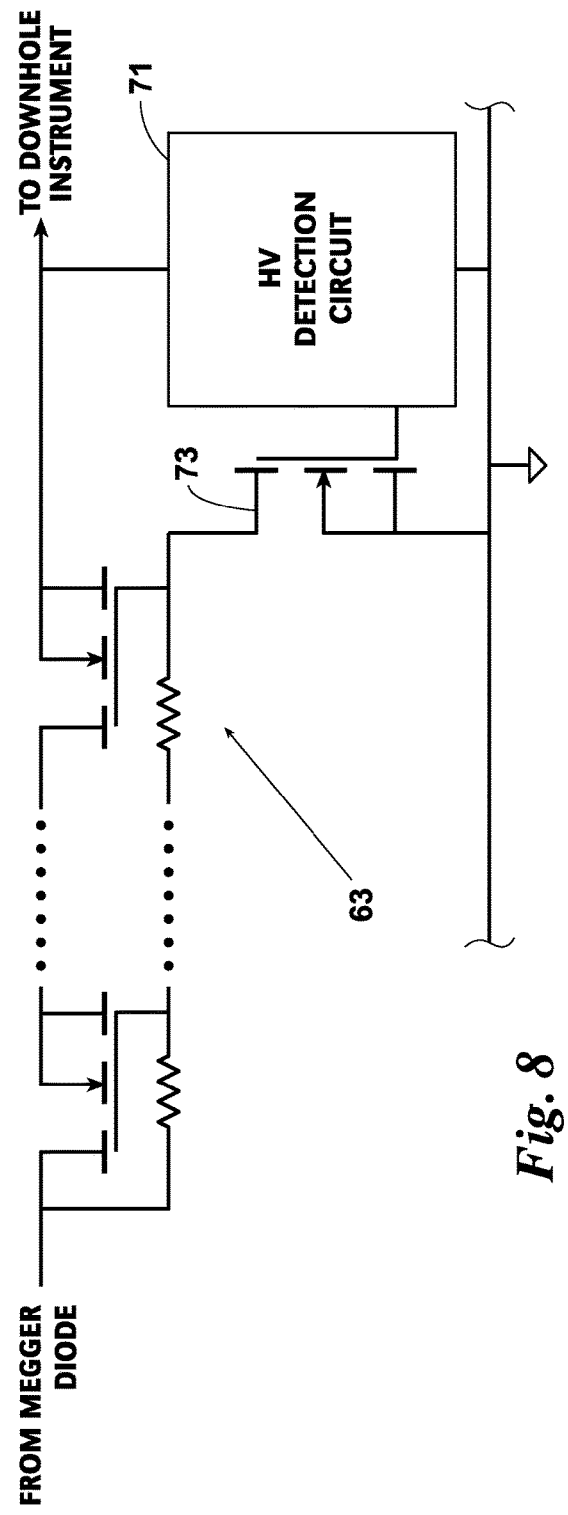
FIG. 8 is a schematic of an alternate embodiment of the high voltage protection circuit. A detection circuit opens the connection between the downhole wye point and the downhole instrument when the downhole wye point voltage exceeds a predetermined value.

In the preferred embodiment, the circuit 63 is comprised of multiple stages (see FIG. 7). An alternative embodiment of the circuit 63 operates by opening the connection between the downhole wye point 40 and the downhole instrument 60 when the downhole wye point 40 voltage exceeds a predetermined value (see FIG. 8).

The downhole instrument 60 utilizes sensors to acquire environmental parameters such as, but not limited to, pressure, temperature, and vibration and then converts the acquired sensor data into a data stream readable by the surface controller 15. A downhole transmitter 65 modulates the current drawn by the instrument 60 from the power supply 11. This modulated current represents the sensor data collected by the downhole instrument 60.

Normal Mode of Operation

When no ground fault occurs along the power cable 30 and when imbalances are low, the voltage seen at the downhole wye point 40 is comprised of the power supply signal being generated by the surface controller 15 less any losses in the power cable 30 and motor windings. Due to the presence of the megger test diode 50, the downhole instrument 60 is limited to draw the current required for its operation and telemetry only during the positive cycles of the current waveform from the surface power supply 11. The negative cycles are not used. This current waveform is composed of the loading of the instrument's power supply, motor winding losses, cable losses, and the downhole instrument's telemetry current modulation.

Ground Fault Mode of Operation

When a ground fault occurs along the power cable 30, the voltage seen at the wye point 40 is dominated by the motor supply voltage (which can be several thousand volts). The circuit 63 limits the voltage seen by the electronics at its output to a lower value (preferably no greater than 80 V, see FIG. 6) and protects the downhole electronics while still allowing communication with the surface controller 15 during all positive cycles of the current waveform. The negative cycles are not used. For uplink communication, the downhole instrument 60 modulates the current being drawn through the high voltage protection circuit 63 during positive power cycles.

In a preferred embodiment of the high voltage protection circuit 63 (see FIG. 5), a Zener diode 67 sets the limiting voltage. At least one power semiconductor 69 or an arrangement of power semiconductors 69 (which can be several SiC FETS) see the voltage drop (which can be several thousand volts) and must be able to dissipate significant power. Several stages of circuits 63 may be connected in series in order to distribute the voltage drop and power dissipation over the stages (see FIG. 7).

In an alternate preferred embodiment of circuit 63 (see FIG. 8), a high voltage detection circuit 71 and one or more additional commutation semiconductors 73 replace the Zener diode 67 arrangement. Upon detection of a high voltage event, the detection circuit 71 opens the high voltage protection circuit 63. Similar to the other embodiment of circuit 63, this embodiment limits the voltage seen by the electronics at its output to a lower value (preferably no greater than 80 V) and protects the downhole electronics while still allowing communication with the surface controller 15 when the circuit is closed and during positive cycles of the current waveform. Method of Use Referring to FIGS. 1 to 8, a method of bi-directional data communication for a downhole instrument 60 includes the steps of modulating a current of the downhole instrument 60 through a high voltage protection circuit 63 for uplink communication and modulating a power waveform of the surface AC power source 11 for downlink communication. The telemetry carrier frequency of the downhole instrument 60 can be dependent on power cable spectrum components measured at the downhole three-phase wye point 40 with the modulating step occurring on a positive cycle of the power waveform. The output frequency of the surface AC power source 11 can be dependent on power cable spectrum components measured at a surface.

The method can also include the step of blocking a current to the downhole instrument 60 when in a negative voltage condition. The blocking step can be accomplished by a megger test diode 50 located between the wye point 40 of a motor assembly of a downhole tool and the high voltage protection circuit 63. Voltage and frequency is sensed downstream of the megger test diode 50 and clear assessment of frequency prior to uplink communication is done.

The preferred embodiments described above are not all possible embodiments of the invention. The invention is defined by the following claims and the full range of equivalency to which each element of the claims is entitled.

What is claimed:

1. A bi-directional data communication system for a downhole instrument associated with a downhole tool, the bi-directional data communication system comprising: a megger test diode located below a wye point of the downhole tool; and at least one high voltage protection circuit connected to the megger test diode, the high voltage protection circuit including means for limiting a voltage to the downhole instrument and means for dissipating power, wherein the limiting voltage is set by means of a high voltage detection circuit which opens a connection between the wye point and the downhole instrument when a downhole wye point voltage exceeds a predetermined voltage value.

2. A bi-directional data communication system according to claim 1 wherein the limiting-voltage is set by means of a Zener diode.

3. A bi-directional data communication system according to claim 1 wherein the bi-directional data communication system is arranged to conduct a current to the downhole instrument during positive cycles of a power waveform but not during negative cycles of the power waveform.

4. A bi-directional data communication system according to claim 1 wherein the means for dissipating power includes at least one power semiconductor.

5. A bi-directional data communication system according to claim 1 further comprising a sensor for sensing at least one of a voltage and a frequency downstream of the megger test diode.

6. A bi-directional data communication system according to claim 1 further comprising means for generating a current modulated signal that encodes data collected by the downhole instrument.

7. A bi-directional data communication system according to claim 6 wherein the means for generating the current modulated signal is a transmitter of the downhole instrument.

8. A bi-directional data communication system according to claim 6 wherein the current modulation occurs on positive cycles of a surface-generated power supply waveform.

9. A bi-directional data communication system according to claim 1 wherein an output frequency of a surface AC power source for the downhole instrument is dependent on power cable spectrum components measured at a surface three-phase wye.

10. A bi-directional data communication system according to claim 1 wherein a modulation carrier frequency of the downhole instrument is dependent on power cable spectrum components measured at a downhole three-phase wye.

11. A bi-directional data communication system according to claim 1 further comprising means for frequency assessment prior to uplink communication.

12. A method of bi-directional data communication for a downhole instrument, the method comprising the steps of: modulating a current of the downhole instrument through a high voltage protection circuit for uplink communication from the downhole instrument; modulating a power waveform of a surface AC power source in communication with the downhole instrument for downlink communication to the downhole instrument; wherein the bi-directional data communication system is arranged to conduct a constant current to the downhole instrument during positive cycles of the power waveform but not during negative cycles of the power waveform, wherein the high voltage protection circuit includes a high voltage detection circuit and at least one power semiconductor, the high voltage detection circuit opening a connection between the wye point and the downhole instrument when a downhole wye point voltage exceeds a predetermined voltage value.

13. A method according to claim 12 wherein an output frequency of the surface AC power source is dependent on power cable spectrum components measured at a surface three-phase wye.

14. A method according to claim 12 wherein a modulation carrier frequency of the downhole instrument is dependent on power cable spectrum components measured at a downhole three-phase wye.

15. A method according to claim 12 wherein the current modulating step occurs on a positive cycle of the power waveform.

16. A method according to claim 12 further comprising the step of blocking a current to the downhole instrument when in a negative voltage condition.

17. A method according to claim 16 wherein the blocking step is accomplished by a megger test diode located between a wye point of a motor assembly of a downhole tool and the high voltage protection circuit.

18. A method according to claim 17 further comprising the step of sensing at least one of a voltage and a frequency downstream of the megger test diode.

19. A method according to claim 12 further comprising the step of assessing a frequency prior to the uplink communication.

20. A method according to claim 12 wherein the high voltage protection circuit includes a Zener diode and at least one power semiconductor, the high voltage protection circuit limiting the voltage at its output to a maximum voltage acceptable by the downstream electronics.

* * * * *